UNITED STATES PATENT OFFICE.

PHILIPP PAUL, OF BLACK EARTH, WISCONSIN.

IMPROVEMENT IN MEDICAL COMPOUNDS OR EYE-WASHES.

Specification forming part of Letters Patent No. 121,467, dated December 5, 1871.

*To all whom it may concern:*

Be it known that I, PHILIPP PAUL, of Black Earth, in the county of Dane and State of Wisconsin, have invented a certain Composition and Process for Curing Diseased Eyes, of which the following is a specification:

I take two tea-spoonfuls of sugar of lead and one tea-spoonful of crushed sugar and mix the same together. Of this mixture I take one tea-spoonful and mix the same with the white of one egg, and thoroughly beat the same to a foam, throwing off and rejecting the scum from the surface. A liquid is thus formed which is bottled for use.

To cure diseased or inflamed eyes take a goose or pigeon-feather and apply the mixture to the inside of the lid and around the eye. This application is to be made three times a day until a cure is effected, making the medicine stronger with the mixture of sugar of lead and sugar as fast as the above quantity is used up, and thus used from day to day.

The patient should abstain from the use of liquor, tobacco, coffee, salt meat, and stimulating food during treatment. It takes from three or four weeks to as many months to effect a cure.

I do not claim the use of sugar of lead as a medicine for the eye, either alone or in combination with ingredients other than above specified.

I claim as my invention—

The combination of sugar of lead with sugar and the white of an egg, forming a mixture as a medicine for diseased eyes, substantially as above described.

PHILIPP PAUL.

Witnesses:
   FRANCIS MASSING,
   CHAS. T. WAKELEY. (98)